United States Patent
Zhang et al.

(10) Patent No.: US 8,739,283 B1
(45) Date of Patent: May 27, 2014

(54) AUTOMATIC GENERATION OF MALWARE CLEAN PATTERN

(75) Inventors: Zhihe Zhang, Nanjing (CN); Mingyan Sun, Beijing (CN); Zhengmao Lin, Shanghai (CN)

(73) Assignee: Trend Micro, Inc., Tokyo (JP)

( * ) Notice: Subject to any disclaimer, the term of this patent is extended or adjusted under 35 U.S.C. 154(b) by 596 days.

(21) Appl. No.: 12/632,158

(22) Filed: Dec. 7, 2009

(51) Int. Cl.
G06F 11/00 (2006.01)
G06F 21/56 (2013.01)
G06F 21/36 (2013.01)
H04L 29/06 (2006.01)

(52) U.S. Cl.
CPC .............. *G06F 21/566* (2013.01); *G06F 21/56* (2013.01); *G06F 21/36* (2013.01); *H04L 63/1416* (2013.01); *H04L 63/1441* (2013.01)
USPC ................... 726/24; 726/22; 726/23; 726/25

(58) Field of Classification Search
CPC ... G06F 21/566; G06F 21/56; G06F 11/3612; G06F 21/36; H04L 63/1416; H04L 63/1441
USPC .................................................... 726/22–25
See application file for complete search history.

(56) References Cited

U.S. PATENT DOCUMENTS

| | | | | |
|---|---|---|---|---|
| 6,963,978 B1 * | 11/2005 | Muttik et al. | ................. | 713/188 |
| 7,694,150 B1 * | 4/2010 | Kirby | ............................. | 713/188 |
| 8,266,698 B1 * | 9/2012 | Seshardi et al. | ................ | 726/24 |
| 8,375,450 B1 * | 2/2013 | Oliver et al. | ..................... | 726/23 |
| 2005/0172338 A1 * | 8/2005 | Sandu et al. | ..................... | 726/22 |
| 2007/0143843 A1 * | 6/2007 | Nason et al. | ..................... | 726/22 |
| 2008/0127336 A1 * | 5/2008 | Sun et al. | ......................... | 726/22 |
| 2008/0222725 A1 * | 9/2008 | Chayes et al. | .................. | 726/23 |
| 2009/0006575 A1 * | 1/2009 | Hulten et al. | ................. | 709/207 |
| 2009/0031162 A1 * | 1/2009 | Bose et al. | ......................... | 714/2 |

* cited by examiner

*Primary Examiner* — Harunur Rashid
(74) *Attorney, Agent, or Firm* — Beyer Law Group LLP

(57) ABSTRACT

A computing device is capable of automatically detecting malware execution and cleaning the effects of malware execution using a malware repair module that is customized to the operating features and characteristics of the computing device. The computing device has software modules, hardware components, and network interfaces for accessing remote sources which, collectively, enable the device to restore itself after malware has executed on it. These modules, components, and interfaces may also enable the apparatus to delete the malware, if not entirely, at least partially so that it can no longer execute and cause further harm. The malware repair module is created from a detailed malware behavior data set retrieved from a remote malware behavior database and then modified to take into account specific operating features of the computing device. The repair module executes on a repair module execution engine and the effects of the malware on the device are minimized.

26 Claims, 6 Drawing Sheets

AUTOMATIC GENERATION OF MALWARE CLEAN PATTERN

BACKGROUND OF THE INVENTION

1. Field of the Invention

The present invention relates generally to computing devices and software for protection against malware. More specifically, it relates to generating customized clean patterns for deleting malware files and repairing damage from malware execution on a computing device.

2. Description of the Related Art

Malware is on the rise. The types of malware and their proliferation and complexity increases with time and affects more users, as an increasing number of people are getting on the Internet or using computers on both public and private networks from remote locations. Once malware gets on a computer and executes, damage is inevitable and further use of the computer may be seriously impaired or may cause even greater damage, such as loss of data and software.

Currently there are procedures and methodologies available to clean up a computer or block further harm to a computer from malware. For example, there are scripts available called "clean patterns" that a user can execute on his computer to clean it or restore it to a normal operating state after malware execution has been detected. Currently there are generic clean patterns which, given the increasing sophistication of malware today, have limited capabilities for restoring a computer. They often reside on the computer and perform some basic clean-up and restore functions, but are not tailored to a specific malware program or virus. Other more effective clean patterns require too much time and resources to generate once malware execution on the computing device has begun. And while generic clean patterns may be available on the computer for immediate execution to address the malware execution early, these patterns cannot deal with special malware behavior or any type of malware behavior that is not considered typical or generic. This falls short of adequate protection in light of the growing sophistication of malware in terms of their deployment, effects on the computer, tools needed for their clean up, and execution.

Currently, clean patterns are typically prepared manually; that is, by malware threat analysts and engineers. They use their vast, collective knowledge and experience of malware behavior and execution to manually write a clean pattern that is specifically tailored for a targeted malware program based on that malware's execution indicators. The analysts study the malware execution related data, such as early indicators of potential malware typically collected by a malware detection engine, malware samples (if available) and then use their experience, knowledge, intuition, and a set of rules and guidelines for generating (i.e., writing) clean patterns that are transmitted back to the computing device where it is executed on a clean engine to clean the device of the suspected malware. This process—from early detection to clean pattern execution—has become inefficient, slow, and resource intensive. As noted, this is particularly true given the rise in malware proliferation and the number of users. More people are getting onto the Internet and other networks via wireless devices (e.g., laptops, netbooks, mini laptops, mobile handsets, etc) and, consequently, it is getting increasingly difficult for anti-malware providers (companies who employ the Web threat analysts and engineers) to manually generate and disseminate clean patterns quickly enough to prevent serious damage to a computer for all subscribers (users). Although these providers may strive to be as nimble, reactive and efficient as possible, the sheer volume of malware activity and users is making these goals difficult to achieve. Furthermore, many users, such as home users, may not realize that malware is executing on their devices or that their anti-malware (security) software provider is supplying them with a so-called clean pattern that they should execute as soon as possible to prevent further damage. Not surprisingly, many may not know or even heard of a clean pattern or realize that something needs to be done on their computing devices to prevent serious harm, such as loss of data.

SUMMARY OF THE INVENTION

Methods for automatically cleaning a computing apparatus from malware execution are described. A computing apparatus has software modules, hardware components, and network interfaces for accessing remote sources which, collectively, enable the apparatus to restore itself after malware has executed on it. These modules, components, and interfaces may also enable the apparatus to delete the malware, if not entirely, at least partially so that it can no longer execute and cause further harm.

In one embodiment, a method of repairing malware damage on a computing device is described. Malware execution is detected on the computing device and a malware detection data set for an identified malware results from this detection. A remote source is queried using the malware detection data set. The remote source may be a collection of malware behavior databases (or a single database) that can be searched using the malware detection data set which contains early indicators of malware behavior. An initial malware behavior data set is received in response to the query. This data set contains detailed behavioral data (retrieved from the malware behavior databases) for a particular malware that best matched the data in the malware detection data set. From the initial malware behavior data set, a customized malware behavior data set is created that is specific to the operating features and characteristics of the computing device. From the customized data set, a malware repair software module is generated. In one embodiment, the repair software module is generated by examining one or more encoded malware repair knowledge rules. This module is then executed on the computing device, resulting in reducing the effects of the identified malware on the device.

BRIEF DESCRIPTION OF THE DRAWINGS

References are made to the accompanying drawings, which form a part of the description and in which are shown, by way of illustration, particular embodiments.

DETAILED DESCRIPTION OF THE INVENTION

When malware gets on a computer or any type of computing device and begins execution, damage to the computer typically begins immediately. Ideally, it is preferable to prevent the malware from getting on the computer in the first place. However, once it is on a computer and begins execution, the goal is to detect it early and delete it so that it does not cause any further harm. After that, the goal is to restore the computer to its normal operating condition, by repairing any damage that the malware caused. The degree of damage can, of course, vary widely and will likely depend on many factors, such as the type of malware and how long it was executing before it was detected and deleted. In order to delete the malware files and possibly repair any damage, the computer executes a malware repair software module on a repair execution engine. These are also referred to as a "clean pattern" algorithm that executes on a "clean engine." The more customized the clean pattern is to the specific features of the computer and the faster it is generated and executed on the clean engine, the more effective the clean pattern is in deleting the malware files and repairing or cleaning the computer from any malware damage.

Methods and systems for automatically generating a customized malware repair module and executing the module on a repair module execution engine are described in the various figures. A repair module may be described as a short program or script containing computer instructions on how to best delete the malware files and clean the infected computing environment. These steps or instructions are executed by a repair module execution engine that goes about getting rid of the malware as thoroughly as possible. Deleting malware files includes the act of deleting one, some, or all of the files comprising the malware program. It may also include repairing, restoring, or cleaning up the computer of any damage caused by the malware. It may also include deleting malware files and performing some degree of repair such as removing registries that the malware left in the system, terminating processes and threads, removing shortcut links that malware may have dropped.

Figure 1:
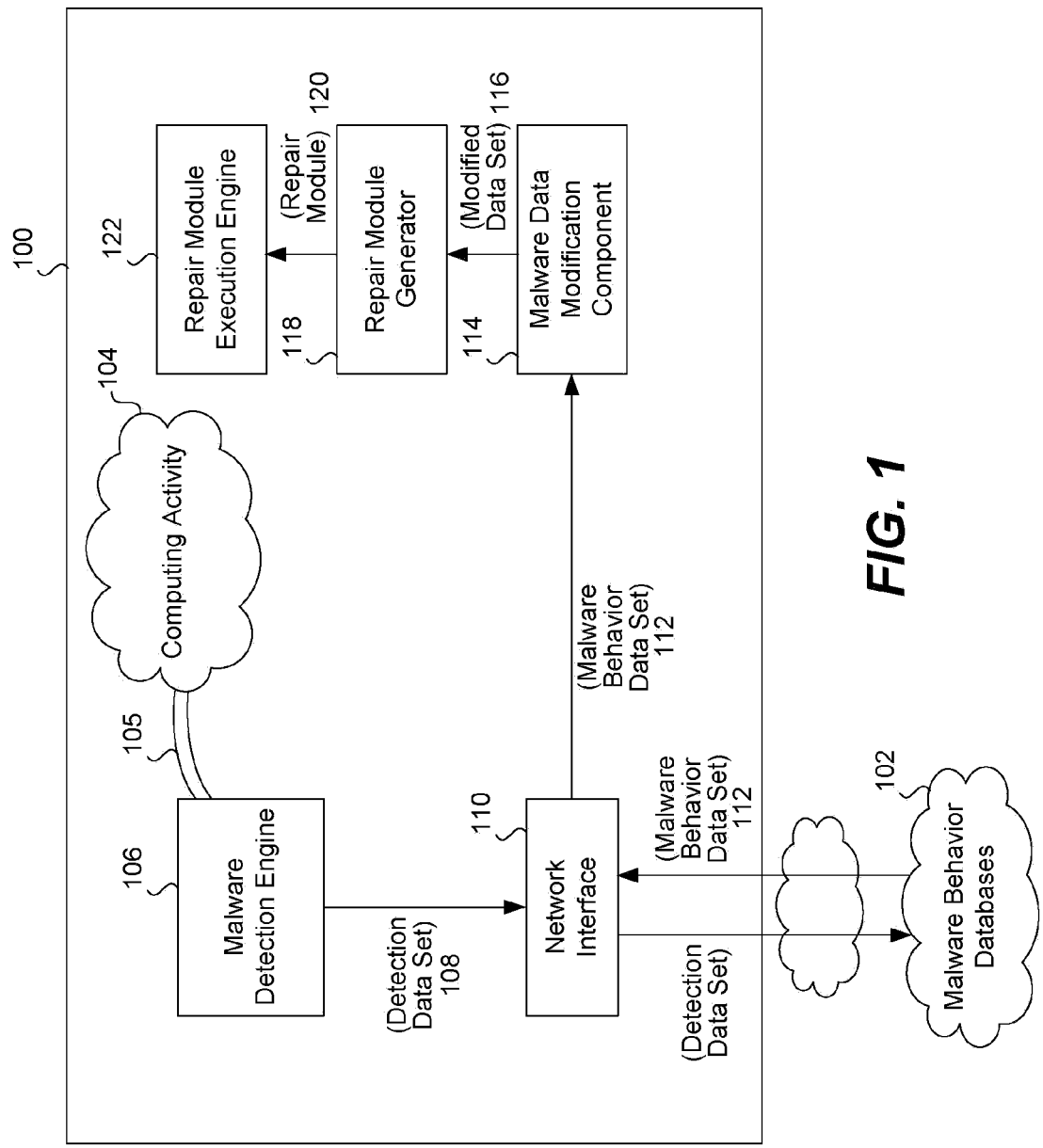
FIG. 1 is a block diagram of a computer or computing device connected to certain remote sources in accordance with one embodiment.

FIG. 1 is a block diagram of a computer or computing device connected to certain remote sources in accordance with one embodiment. A computer 100 contains various hardware and software components. For ease of illustration, certain hardware components of computer 100 are shown in FIGS. 5A and 5B. Computer 100 may be any type of computing device that is susceptible to malware, such as a desktop computer, a laptop computer, a netbook computer, a tablet computing device, a cell phone, a "smart" handset device, a mobile gaming device, an electronic book reader, and the like. It has networking capability and is able to connect to remote sources either over the Internet or over a private network. These connections can be wired, wireless, or a combination of both. In FIG. 1, the remote sources are malware behavior databases or data repositories (shown as malware behavior database 102) that are accessible over the Internet from computer 100. In other embodiments, malware behavior database 102 may be accessible only privately, for example, over an Intranet or VPN connection, within an organization or enterprise (e.g., company, university, government body, etc.). In these contexts, the organization or enterprise maintains database 102 and may make them accessible only to its employees or members. The content and function of malware behavior database 102 are described in detail below.

When computer 100 is operating, there is some amount of computing activity 104, which can vary from minimal (e.g., when computer 100 is in sleep mode) to highly active (e.g., when used for performing multiple, resource-intensive tasks). In either case, computing activity 104 represents the computational operations occurring on computer 100 at any given time while it is powered on. This computing activity 104 is monitored by a malware detection engine 106. Malware detection programs are known in the field of anti-malware and computer security programming. Malware detection engine 106 may be described as a file detection or a virus-signature based system, as these systems are known in the art. Engine 106 monitors computing activity 104. This monitoring, indicated by lines 105, may be constant while computer 100 is powered on, intermittent, or at the discretion of the user. Typically, malware detection engines monitors or performs their detecting function when the computer they reside on is powered on. Malware detection engine 106 is typically supplied and maintained by an anti-malware software provider, such as Trend Micro, Inc. of Cupertino, Calif. ("software provider").

Malware detection engine 106 is trained to detect any computing activity that may be coming from malware. Engine 106 may be based on behavior monitoring techniques or HIPS. If there is malware executing on computer 100, in most cases detection engine 106 will detect it and create a data set or file having data describing operations and actions caused by the suspected malware. In a simple illustration, a malware detection data set 108 may have data that simply provides a listing of each suspicious operation, task, thread, file activity, network connection etc. that has occurred within a certain time frame.

Malware detection data set 108 is sent to a network interface component 110 where it is transmitted to a remote source. Network interface component 110 may provide network connectivity for computer 100 via a wireless or wired connection to the Internet (as shown in FIG. 1) or to an internal, private network. In the described embodiment, remote source is one or more malware behavior databases which may be operated by the provider which also maintains malware detection engine 106. Malware behavior database 102 stores vast amounts of data on known malware behaviors and such databases are currently in use in the field of anti-malware (or anti-virus "AV") programming.

Malware behavior database 102 may be described as representing a so-called cloud of servers and other sources available over the Internet that collectively provide a malware behavior data repository. For ease of explanation, all malware behavior databases and repositories (which computer 100 is allowed to access) are referred to collectively as database 102. Database 102 can be queried using malware detection data set 108 and a match is found, assuming malware detection engine 106 is performing accurately. The service provider may organize database 102 based on a specific index, such as the hash value of malware detection data set 108 (using, for example, SHA1/MD5) or the name of the virus. Further description of the data in database 102 is provided below.

After querying database 102, a detailed malware behavior data set 112 is returned to computer 100 where network interface component 110 forwards detailed data set 112 to a malware data modification component 114. Malware behavior data set 112 contains a detailed description of the behavior, characteristics, features, and other information on the malware that is executing on computer 100, which was identified when malware behavior database 102 was queried with detection data set 108. Detailed malware data set 112 may be described as having all or nearly all that is known (by the anti-malware software provider) about the identified malware. Because the provider is in the business of detecting and fixing malware issues, its database (e.g., database 102) contains extensive knowledge and data about known malware programs.

Malware data modification component 114 accepts detailed malware data set 112 as input and modifies or normalizes it to computer 100. In short, it takes the extensive detailed, generic description of the identified malware and customizes it to computer 100. This step of modifying or customizing data set 112 is described in FIG. 3. The output of modification component 114 is a modified or normalized malware behavior data set 116. This data set still contains a detailed description of the identified malware but is more in line with the features and characteristics of computer 100 and, as a result, is more efficient to process. In order to perform this customization, malware data modification component 114 has extensive data or has access to data describing. That is, component 114 can examine detailed malware behavior data set 112 and modify (normalize) it, producing modified malware behavior data set 116. For example, it can delete any extraneous data, which it knows are irrelevant or inapplicable to the operations of computer 100.

A malware repair module generator 118 accepts as input modified malware behavior data set 116. Repair module generator 118 may also be referred to as a "clean pattern" generator. Repair module generator 118 creates a customized repair module 120, also referred to as a specific clean pattern. Repair module 120 is a script containing instructions and other data that provides the best way to delete the malware based on the malware behavior. Malware repair module 120 is input to a repair module execution engine 122, which may be referred to as a clean engine. Engine 122 is capable of handling repair modules for addressing many different types of malware in different scenarios or contexts. Repair module 120 may be described as being incorporated into engine 122. A sample malware repair module 120 is described below. Repair module execution engine 122 interprets a series of instructions in repair module 120, thereby deleting the malware files from computer 100 and, depending on the complexity of the malware, the instructions in module 120, and other factors may also repair the damage from the malware. Repair module engine 122 may be described as an abstract instruction interpreter where an instruction in the repair module is, for example, a control flow, a stack manipulation instruction, or a more basic operation, such as matching a CRC with a file, opening or killing a process, and the like.

Figure 2:
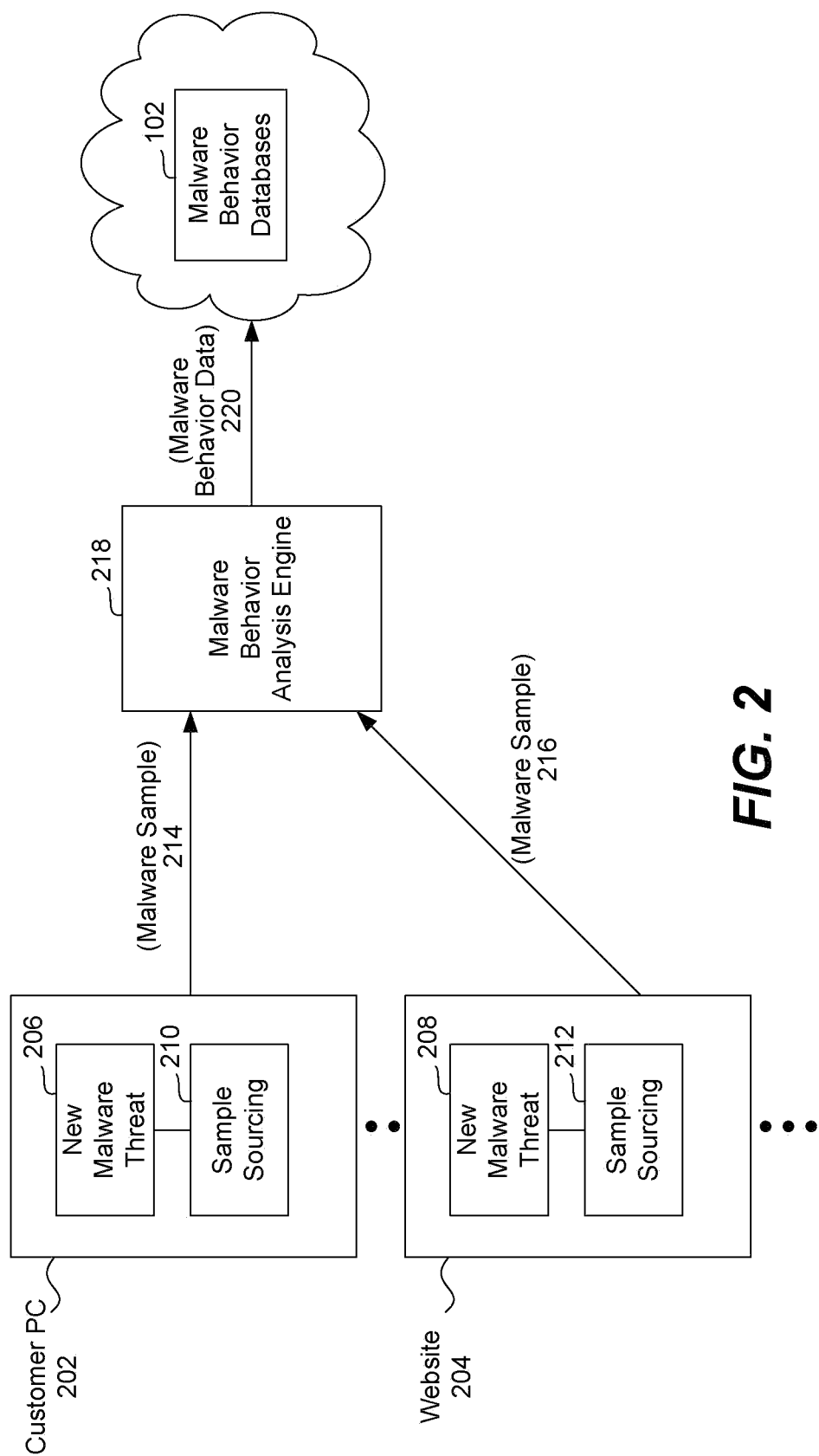
FIG. 2 is a diagram showing how a malware behavior database is maintained in accordance with one embodiment.
Figure 5:
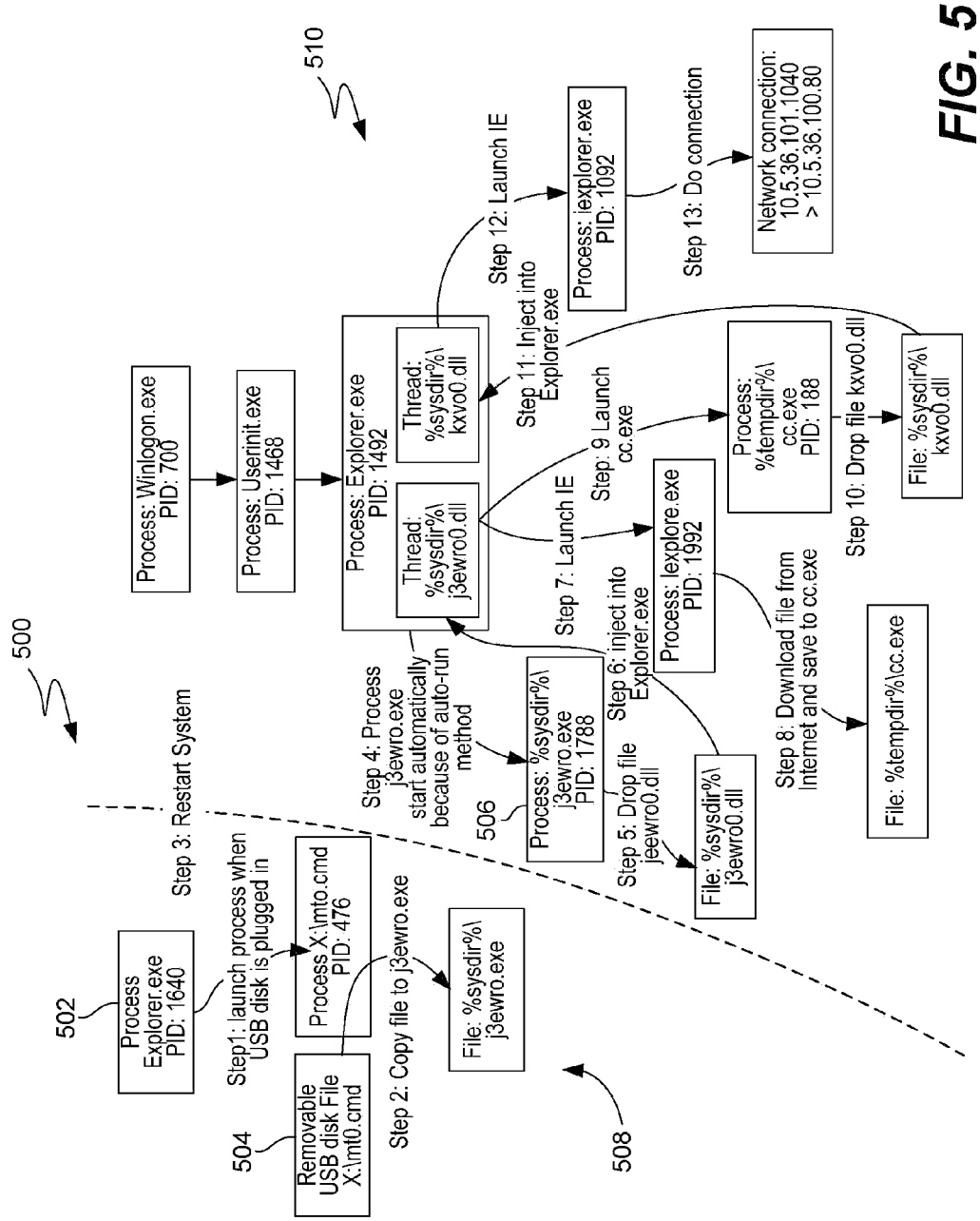
FIG. 5 is a graph diagram of an example of a malware behavior database record in accordance with one embodiment.

FIG. 2 is a diagram showing how malware behavior database 102 is maintained in accordance with one embodiment. As noted above, database 102 represents one or more databases or data repositories where an anti-malware software provider stores data it has learned and collected over time on malware behavior. The goal is to ensure that database 102 is kept up to date and that it stores as much detail as possible about known and newly discovered malware. An example of a malware behavior database record is shown in FIG. 5.

In order to do this, the provider collects malware behavior data from as many sources as it can gain access to. These include the provider's own sites where engineers, "Web threat" analysts, and other employees monitor the Web to detect early signs of new malware, which may include maintaining various types of servers on the Internet and may reading news reports, blogs, press releases, online forums, and so on which may talk about new malware. Other sources include customer computers and Web sites which run the provider's anti-malware software. For example, a customer PC 202 and a Web site server 204 each may be running some type of anti-malware software program from the provider. When a new malware threat 206 or 208 is detected on the computer, a sample of the malware is sourced using techniques known in the art of anti-malware programming, shown by box 210 on PC 202 and by box 212 on Web site 204. Customer PC 202 and Web site server 204 are illustrative of the numerous sources from which the provider can obtain samples. While the actual numbers of sources may vary, it can typically be in the thousands. The malware samples 214 and 216 are transmitted to a malware behavior analysis engine 218 operated by the provider.

Malware samples 214 and 216 contain data on the malware, such as the behavior of the suspected malware files, for example, as what operations were performed, which files were effected, what type of network connections were attempted, and so on. This raw data are processed by analysis engine 218. One example of engine 218 is a tool known as a LiteMars Analyzer from Trend Micro, Inc. of Cupertino, Calif.

Engine 218 can analyze malware samples 214 and 216 and create detailed malware behavior data sets 220 (details of the operations of malware behavior analysis engine 216 are beyond the scope of the present invention). The detailed malware behavior data sets 220 are stored in malware database 102. Using this process, the anti-malware software provider can obtain data on new malware threats as well as on known malware and continually add malware behavior intelligence to its data repositories.

Figure 3:
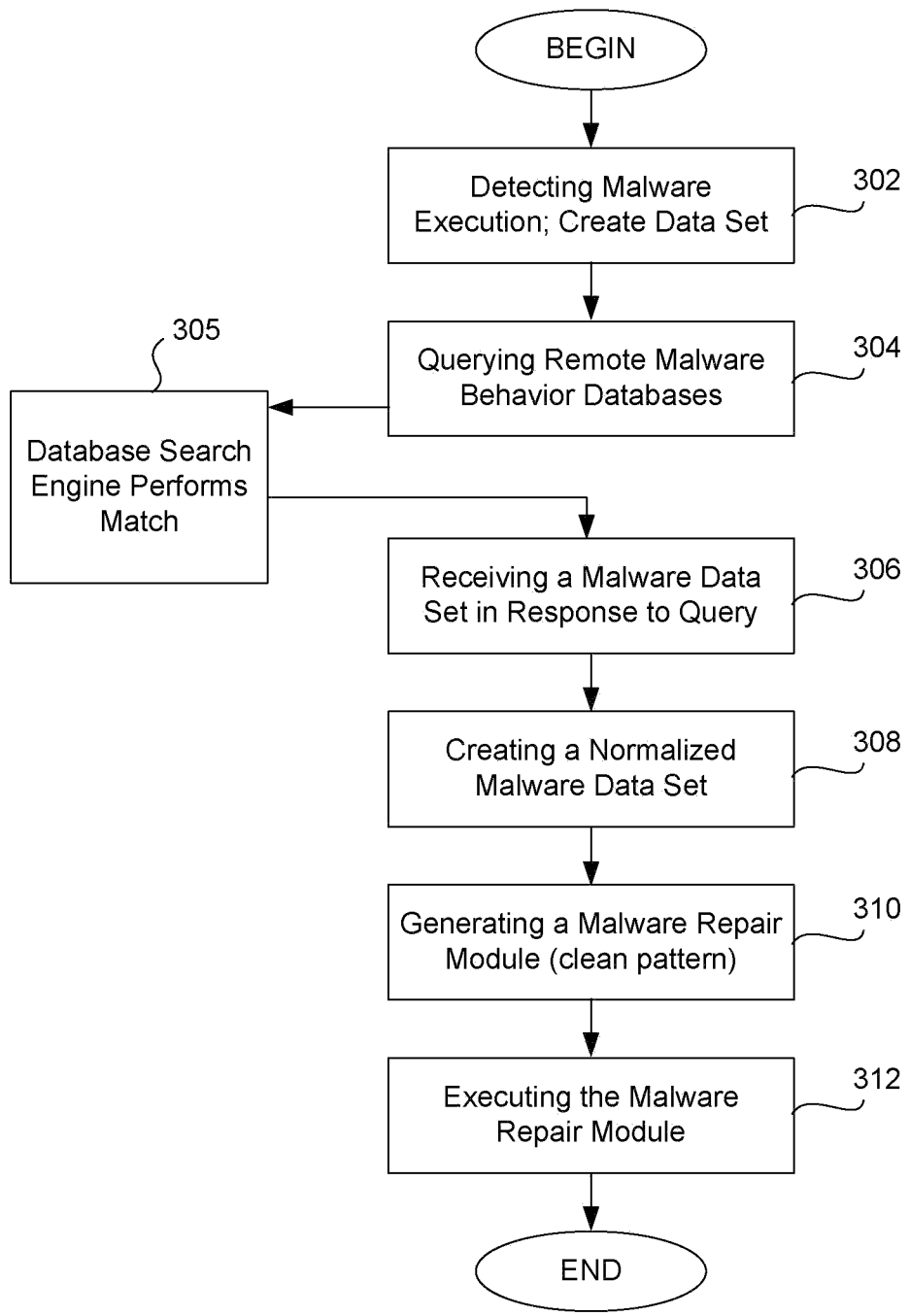
FIG. 3 is flow diagram of a process of generating and executing a malware repair module on a computer in accordance with one embodiment.

FIG. 3 is flow diagram of a process of generating and executing a malware repair module on a computer in accordance with one embodiment. The process begins when a computer is already powered on and operating. At step 302 the computer executes a malware detection engine or other software that is capable of detecting malware. Upon detecting malware execution, a malware detection data set is created. The detection data set consists of a unique index and a record or description of the specific malware behavior on the computer as recorded by the local malware detection module. As noted earlier, this data set contains data describing some or all of the operations performed by the suspected malware executing on the computer. An example of this data set is provided below.

At step 304, the computer queries a remote malware behavior database. In one embodiment, this query is formulated and initiated by the malware detection engine. It has the URL or other address data needed for transmitting the query to the remote behavior database. In one context, this database is accessible online by authorized parties (e.g., customers of the anti-malware software provider). In another context, the database is internal to an organization and is accessed via a private network or VPN. In this context, the provider ensures that the database is maintained and is kept current by working with, for example, the IT group of the organization. The query itself consists of the malware detection data set and essentially asks: "What detailed malware behavior data do you have that matches or corresponds to this malware detection data?" At step 305 a match is performed by a database search engine. The match can be described as examining the data in the detection data set, which may consist of specific file operations, stack manipulations, control flows, steps, and so on, and finding a data set of malware behavior in the vast malware behavior data repository that has those specific characteristics (or a minimum subset of them). The matching can be done in one embodiment by using a unique key to do the search. The key can be a hash value of the malware detection data set (a hash of this file) or the malware (virus) name. Malware behavior may be stored in a various formats. One format is a listing of steps taken by a malware program, where a step is a relationship or link between two nodes, further described below. Examples of steps include:
Step 1: Launch process when USB disk is plugged in
Step 2: Copy file to j3ewro.exe
Step 3: Restart system
Step 4: Process j3ewro.exe start automatically because of auto-run method
Step 5: Drop file jeewro0.dll
Step 6: Inject into Explorer.exe
Step 7: Launch IE An example of a malware behavior database record is shown in FIG. 5. After a match with the malware detection data set is found, control goes to step 306. At step 306 the computer receives a malware behavior data set in response to the query. This data set may be similar in size and scope to the malware detection data set that was used in the query. That is, the database may not have much more additional behavioral data on the malware than what was in the detection data set created by the malware detection engine. In other instances, the malware behavior data set may be larger in size than the detection data set, where the malware behavior database happens to have a large amount of behavioral data on the malware (e.g., the malware has been widespread or known for several years).

It is expected that in all cases some specific malware program or a set of malware behavior will be found to match or correspond to the malware detection data set. In one embodiment, a virus signature or name, or a file hash value is used in the matching operation at the database using the malware detection data set. Although there are many different scenarios with detected malware and malware behavior data in the database, it may be expected that often there will be small or trivial differences between the malware detection data set used in the query and the malware behavior data set returned from the database. This is the case if it is assumed that the malware detection engine on the computer is up-to-date, operating efficiently, and generally functioning as expected. The malware behavior data set is still returned to the computer. It is not expected that the malware detection data set will be exactly the same as the corresponding malware behavior data in the database. Many malware detection engines today are very effective and the information they gather on malware is often all or most of all that is known about that particular malware.

At step 308 a customized malware data set is created. Features, characteristics, limitations, and exceptions of the local computing environment are incorporated into the malware behavior data set returned from the database at step 306. Examples of local or specific malware behavior include specific CRC values of files or a certain mutex name used by the malware. These types of features of malware may change based on operating environment and may be unique in each user computer. This incorporation of local behavior into the "generic" malware data set may also be referred to as "normalizing" the data set to the local environment. As noted above, the malware data set returned from the database may be very detailed, however, it is possible that a significant portion of the behavioral data is not relevant or applicable to the specific computing environment. There may be certain types of file operations or network connections that simply cannot be implemented in the present computing environment and thus may be deleted. In other instances, some of the behavioral data may be adjusted or fine tuned to meet the local behavior. This normalizing process results in a customized or normalized malware behavior data set that is more efficient and accurate in describing how the malware executes or behaves in the local environment. The amount of normalizing necessary may be directly proportional to the similarity between the malware detection data set (step 302) and the returned malware data set (step 306). In one embodiment, the customized malware behavior data set consists of at least two data components, a meta characteristic data set and a specific characteristic data set, which are described in FIG. 4.

At step 310 a malware repair module, also referred to as a clean pattern, is generated. This may be done by a repair module generator or clean pattern generator. The repair module generator accepts as input the meta characteristic data set and the specific characteristic data set, collectively comprising the customized malware behavior data set. It also reads encoded malware repair knowledge rules, also referred to as clean pattern generation rules. Once a malware repair module is generated (based on a normalized malware behavior data set), it is passed to a repair module execution engine.

At step 312 the malware repair module is executed by the engine which deletes the malware files from the computing environment. It may also repair any damage caused by the malware or perform specific clean-up operations, such as removing registries, terminating threads, removing shortcuts, and the like. At this stage the process of generating a repair module and executing it to delete the malware from the computer is complete.

Figure 4:
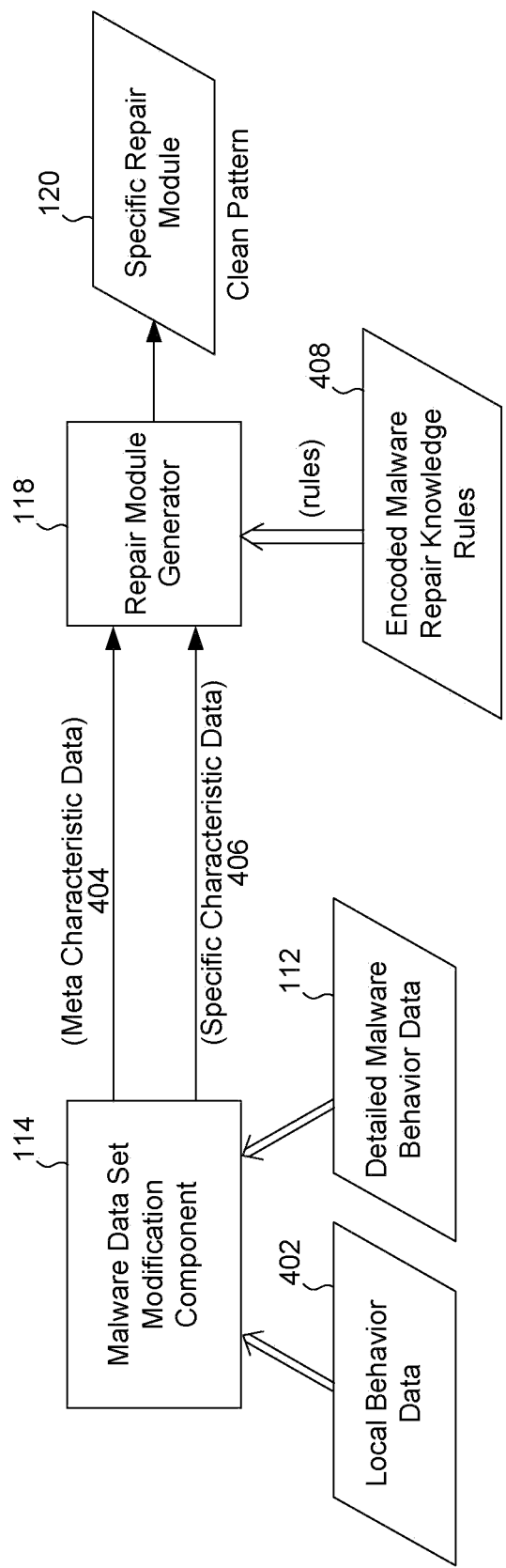
FIG. 4 is a block diagram showing in greater detail the data inputs and outputs of a malware data set modification component and a repair module generator in accordance with one embodiment.

FIG. 4 is a block diagram showing in greater detail the data inputs and outputs of malware data set modification component 114 and repair module generator 118 in accordance with one embodiment. Malware data modification component 114 operates using two sources of data. As shown in FIG. 4, one is the malware behavior data set 112 received from malware behavior database 102. The other data is local malware behavior data 402. Malware typically behaves differently in different environments. Local behavior data 402 may be input to modification component 114 or it may be buffered in memory for quick access by component 112. Once the specific, local behavior of the malware on the specific computer is obtained, modification component 114 uses this specific malware behavior data to modify or normalize malware behavior data set 112. Component 114 outputs a normalized malware behavior data set 116 to repair module generator 118. In one embodiment, the normalization process (or customization process) may be described as first running a graph similarity algorithm, where one graph represents the detailed malware behavior data set 112 and another graph represents local malware behavior data 402. A conventional graph similarity algorithm can compare the two graphs and determine where the two are similar or correspond. For example, which nodes and links in the two graphs are the same. The algorithm can output a third graph that shows the degree of similarity between the two input graphs. For example, if there is a node that is similar in both, such as a file node, there will be a CRC value (property) in each, but these values will be different. Because CRC values of files are mutable by the malware, the value from the local behavior data set will be used. For other characteristics, such as meta-characteristics, the node from the cloud will have more accurate values than the one from the local data set and, therefore, the value from the cloud will be used. (The value from the cloud will be more accurate for certain characteristics because the specific computer may have had much less time to log all malware behavior and thus will not be as accurate as the behavior data from database 102, i.e., the cloud).

In one embodiment, modified data set 116 (of FIG. 1) may be described as having two types of data. One is meta characteristic data 404 and another is specific characteristic data 406. Both these types of data may be derived from malware behavior and be used with repair module generation. Meta characteristic data 404 is high-level behavior data of the malware that can be used to derive instructions on the proper sequence or steps to effectively and safely remove the malware from the computer. For example, malware meta data 404 can provide answers to malware behavior questions: Did the malware inject DLL into the system processes? Will it infect critical system files? Will it propagate with a USB device? and the like. Specific malware characteristic data 406 may address computer or operating system specific issues, such as providing CRC values of files or mutex names used by the malware. One example of malware that has a random mutex is the Conficker Worm. It variants creates a mutex with the name "Global\% s-99" in which % s refers to a machine ID generated based on the machine or computer name on which it is running. This is different from previous malware which often used fixed strings as a mutex to prevent re-infection.

Another input to repair module generator 118 is one or more encoded malware repair knowledge rules 408, also referred to clean pattern generation rules. A knowledge rule is derived by an anti-malware software provider from the collective experience of its engineers and analysts. Essentially, it comes from examining malware and ways of preventing and fixing malware over a long period of time. Rules 408 codify and store the provider's knowledge of malware. For example, to effectively and safely delete a file, a threat analyst or engineer may follow the rule below in writing a repair module or pattern.

```
IF      malicious file is a DLL
        IF the DLL inject into a non-critical process
            Terminate the process after agreement from user and delete
            the DLL
        ELSE // This branch means it injected into system process
            IF we run on a server system and customer will not allow to
boot the machine, terminate one specific thread T whose start address is X
            ELSE
                Mark the file as "delete during reboot" and ask user to
                reboot the machine
            ENDIF
        ENDIF
ENDIF
```

In the various embodiments, guidelines such as this, of which there may be hundreds or thousands, are encoded as repair knowledge rules 408. These knowledge rules are stored on computer 100 so they may be accessed by repair module generator 118 when needed without having to access a remote source, such as a provider database. However, in another embodiment, knowledge rules 408 may be stored on another computer or database, such as on a database server in a private network where the rules can be accessed very quickly or at a remote source on the Internet. This may slow down the generation of a repair script, but will not prevent the process. Repair module generator 118 reads encoded malware repair knowledge rules 408 and has meta malware characteristic data 404 and specific characteristic data 406 as inputs. From this it creates a specific repair script 120 (specific clean pattern) using techniques known in the art.

Remote malware behavior database 102 may be described as being stored in the cloud. It may store behavior data on malware programs that behave similarly and belong to a certain family of malware. Data retrieved from the database and used in the described process may be more accurate if modified with behavior data of the local environment. The data from database 102 may be described as being more accurate for meta-characteristics of the malware behavior, that is, for characteristics that do not vary from one computing environment to another; they remain generally constant. As noted above, examples include whether the malware is a PE infector, does it propagate by USB, and so on. These are general behavior features that do not change. Specific characteristic data 406 is more accurate in describing the behavior of the malware for a specific computing environment. These include the CRC of a file or a mutex name used by the file. These characteristics of malware behavior may change in each instance of infection in various computing environments. That is, the malware, such as a virus, may mutate these characteristics frequently. Other examples include downloading from a certain URL, connecting with a certain SMTP server, modifying a specific registry to disable a Windows firewall, and the like. Thus, the goal of the modification or normalization is to combine the two sources of behavior data such that the repair module generation component 118 can create an efficient and customized malware repair module.

A repair module may have two sections: a scan section and a clean section. The scan section scans the computer operating environment to determine if the malware is still active. The clean section performs cleaning operations to delete malware components that resulted from the malware operation, such as corrupt files, processes, threads, registries, and so on. An example of a malware repair module may be:

```
//*SCAN SECTION*//
H_process("adtomi-a.exe")
w01 pop
H_close( )
;check fromregistry Run key
check_file_with_crc("%systemdir%\adtomi-a.exe",
5f9749ea, 0)
w03 pop
H-registry(HKLM, "%regrun%")
H_reg_exist_val("IMClass")
..................................................
//*CLEAN SECTION*//
set_TSC_flag(VIRUS_FOUND, "true")
CleanSection
r01 jne(1)CLEAN2
process_kill("adtomi-a.exe"),
;CLEAN2
r03 jne(1)CLEAN3
file_dei("%systemdir%\adtomi-a.exe")
:CLEAN4
:END
}
```

Malware Behavior Database Example

A record or data set in malware behavior database 102 may be described as a series of steps that characterizes the behavior a malware program. Each of these steps has two types of information, one referred to as a node and another as a link. A node is a software object, such as a process, file, or thread. In one embodiment, a malware behavior database record may be implemented in XML format. Examples of nodes include:
<Node>
<ID>19<ID>
<Type>File<Type>
<FileName> . . . </FileName>
<DriveType>DRIVE_REMOVABLE</DriveType>
</Node>
<Node>
<ID>8</ID>
<Type>File</Type>
<FileName> . . . </FileName>
<DriveType>DRIVE_FIXED</DriveType>
</Node>

Another type is a link, which describes the relationship between two nodes, such as Process A drops file B, Thread A injects DLL into process B, and so on. Examples of links include:

```
<Link>
<SrcID>10</SrcID>
<Type>CopyTo </Type>
<DstID>8<</DstID>
<Link>
<SrcID>8</SrcID>
<Type>Image</Type>
<DstID>7</DstID>
</Link>
```

FIG. 5 is a graph diagram of an example of a malware behavior database record in accordance with one embodiment. A series of steps (Step 1, Step 2, Step 3 . . . ) as described above in FIG. 3 show the actions taken between nodes, for example, nodes 502, 504, and 506, representing Processes, Files, Network connections and so on. A graph diagram 500 shown, which has two segments, 508 and 510, is for the malware TROLLINEAGE, which is typical of a modern malware program.

In another embodiment, a computing device is capable of automatically cleaning the effects of malware execution that has occurred on the device. The device includes a processor, a network interface, and a memory device, as described in FIGS. 6A and 6B below. The memory device stores a malware detection engine that is capable of detecting potential malware behavior on the device. During the detection, if potential malware is detected, a malware detection data set is created. The memory device also contains a malware behavior data modification component which modifies a malware behavior data set that is returned to the device from a remote source, such as a collection of malware behavior databases, via the network interface. The malware behavior data set is input to a malware repair module generator component, also stored in memory, which generates a malware repair module. The malware repair module executes on a repair module execution engine. Using this process, execution of the repair module execution engine on the processor prevents further damage from the malware on computing device.

Figure 6A:
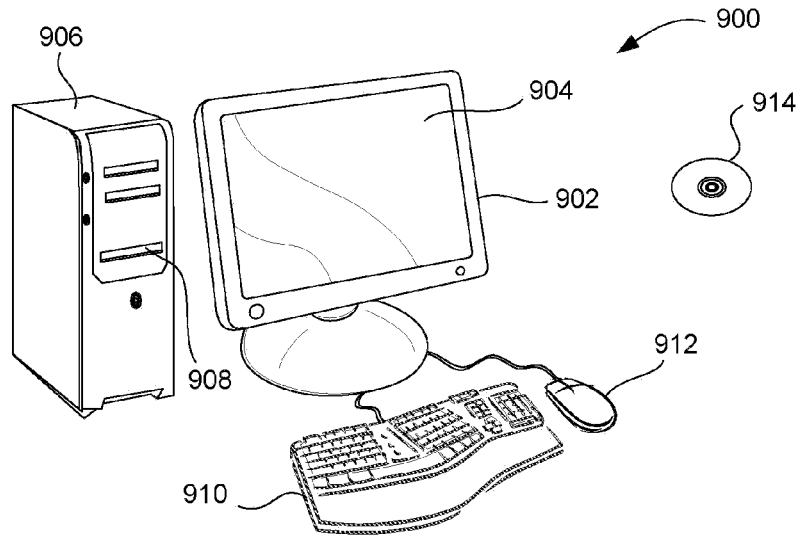
FIGS. 6A and 6B are block diagrams of a computer system suitable for implementing embodiments of the present invention.
Figure 6B:
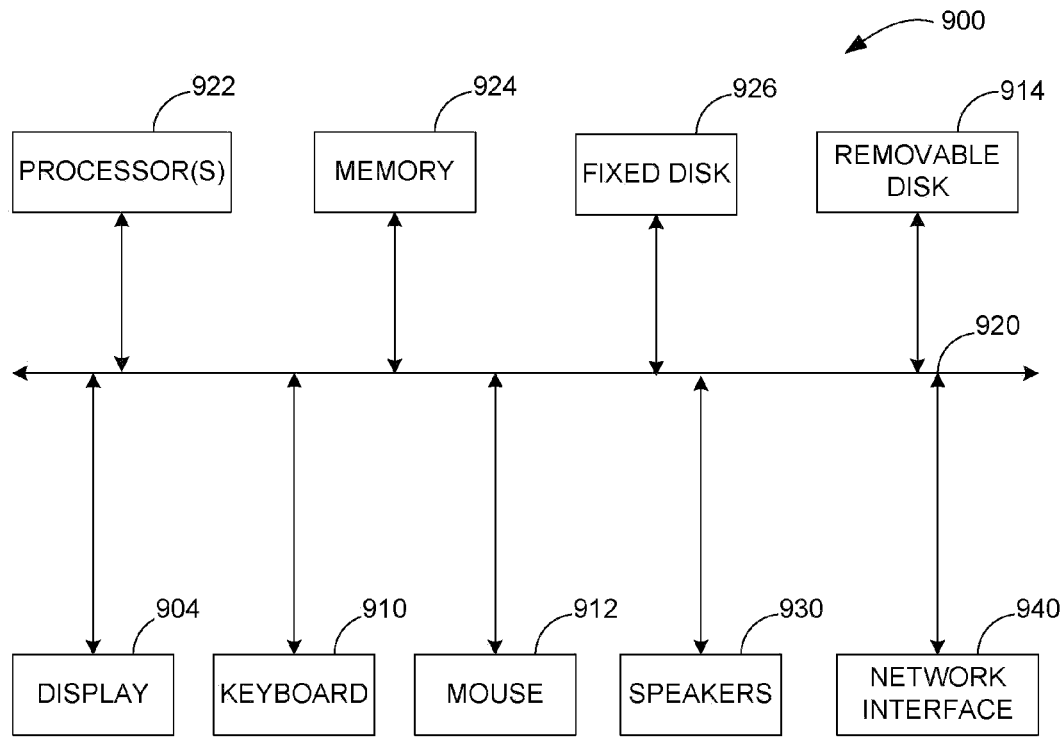

FIGS. 6A and 6B are diagrams of a computer system 700 suitable for implementing embodiments of the present invention. FIG. 6A shows one possible physical form of a computer system or computer as described above. Of course, the computer system may have many physical forms including an integrated circuit, a printed circuit board, a small handheld device (such as a mobile telephone, handset or PDA), a personal computer, a server computer, a laptop or netbook computer, or a super computer. Computer system 700 includes a monitor 702, a display 704, a housing 706, a disk drive 709, a keyboard 710 and a mouse 712. Disk 714 is a computer-readable medium used to transfer data to and from computer system 700.

FIG. 6B is an example of a block diagram for computer system 700. Attached to system bus 720 are a wide variety of subsystems. Processor(s) 722 (also referred to as central processing units, or CPUs) are coupled to storage devices including memory 724. Memory 724 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 726 is also coupled bi-directionally to CPU 722; it provides additional data storage capacity and may also include any of the computer-readable media described below. Fixed disk 726 may be used to store programs, data and the like and is typically a secondary storage medium (such as a hard disk) that is slower than primary storage. It will be appreciated that the information retained within fixed disk 726, may, in appropriate cases, be incorporated in standard fashion as virtual memory in memory 724. Removable disk 714 may take the form of any of the computer-readable media described below.

CPU 722 is also coupled to a variety of input/output devices such as display 704, keyboard 710, mouse 712 and speakers 730. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 722 optionally may be coupled to another computer or telecommunications network using network interface 740. With such a network interface, it is contemplated that the CPU might receive information from the network, or might output information to the network in the course of performing the above-described method steps. Furthermore, method embodiments of the present invention may execute solely upon CPU 722 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are illustrative and not restrictive, and the invention is not to be limited to the details given herein, but may be modified within the scope and equivalents of the appended claims.

What we claim is:

1. A method of deleting malware files from a computing device, the method comprising:
   detecting malware execution on the computing device, the malware execution detected by a malware detection engine, the engine creating a local detection data set corresponding to the detected malware, the local detection data set indicating how the detected malware operates on the computing device;
   querying a remote source using the local detection data set;

receiving a malware behavior data set in response to the query, the malware behavior data set indicating how the detected malware operated on at least one other computing device;

running a graph similarity algorithm, wherein a first input to the algorithm is a first graph representing the malware behavior data set and a second input to the algorithm is a second graph representing the local detection data set, wherein the first graph includes at least first and second nodes and a link, wherein said first node is a process said second node is a file, and said link is a step taken by said detected malware that describes a relationship between said process and said file;

outputting a third graph representing a degree of similarity between the first graph and the second graph;

creating a modified malware behavior data set based upon the third graph;

generating a malware deletion software module using the modified malware behavior data set; and executing the malware deletion software module and deleting one or more malware files associated with the detected malware from the computing device.

2. A method as recited in claim 1 wherein creating the modified malware behavior data set further comprises:

modifying the malware behavior data set to incorporate specific malware behavior of the detected malware executing on the computing device.

3. A method as recited in claim 2 wherein modifying the malware behavior data set further comprises:

examining specific behavioral characteristics of the detected malware.

4. A method as recited in claim 1 wherein the remote source is a malware behavior database containing behavior data relating to various malware.

5. A method as recited in claim 1 wherein generating the malware deletion software module further comprises:

examining an encoded malware deletion knowledge rule.

6. A method as recited in claim 1 wherein the local detection data set contains a malware execution data indicator, the malware behavior data set contains malware behavior data retrieved from the remote source based on the malware execution data indicator, and the modified malware behavior data set contains normalized malware behavior data based on the malware behavior data set and the local detection data set.

7. A method as recited in claim 1 wherein executing the malware deletion software module further comprises:

repairing the computing device of damage caused by the detected malware.

8. A method as recited in claim 1 further comprising:

when a node in the first graph corresponds to a node and in the second graph and their values are mutable by malware, using a value from said node in the second graph in the modified malware behavior data set.

9. The method as recited in claim 1 wherein the modified malware behavior data set includes a meta-characteristic data set that is used to derive instructions to remove malware from the computing device and a specific characteristic data set having data specific to the computing device.

10. A method as recited in claim 1 further comprising:

using a value from said local detection data set in said modified malware behavior data set when a particular malware behavior is mutable by the malware and using a value from said malware behavior dataset in said modified malware behavior data set when the particular malware behavior is not mutable by the malware.

11. A method of repairing a computing environment in a computing device from malware execution, the method comprising:

receiving a global malware behavior data set from a remote malware behavior database through a network interface of the computing device, the global malware behavior data set indicating how the malware operated on at least one other computing device;

retrieving a local malware behavior data set from a memory in the computing device describing the malware execution in the computing environment;

running a graph similarity algorithm, wherein a first input to the algorithm is a first graph representing the global malware behavior data set and a second input to the algorithm is a second graph representing the local malware behavior data set, wherein said first graph includes at least first and second nodes and a link, wherein said first node is a process, said second node is a file, and said link is a step taken by malware that describes a relationship between said process and said file;

outputting a third graph representing a degree of similarity between the first graph and the second graph;

deriving a normalized data set based upon the third graph;

creating a clean pattern using the normalized data set using a processor, wherein the clean pattern contains malware cleaning instructions that are specific to the computing environment on the computing device; and executing the clean pattern using the processor and repairing the computing environment.

12. A method as recited in claim 11 wherein deriving the normalized data set further comprises:

comparing the global malware behavior data set with the local malware behavior data set; and determining when to use a global characteristic value or a local characteristic value.

13. A method as recited in claim 12 further comprising:

determining similarities between the global malware behavior data set and the local malware behavior data set.

14. A method as recited in claim 13 wherein the determining step further comprises:

examining the similarities and determining whether a global characteristic or a local characteristic should be used.

15. A method as recited in claim 11 further comprising:

detecting the malware execution in the computing environment using a malware detection engine.

16. A method as recited in claim 11 wherein the clean pattern includes a scan section for scanning the computing environment to determine whether the malware is present and a clean section for repairing damage caused by the malware.

17. A method as recited in claim 11 further comprising:

when a node in the first graph corresponds to a node in the second graph and their values are mutable by malware, using a value from said node in the second graph in the normalized data set.

18. The method as recited in claim 11 wherein the normalized data set includes a meta-characteristic data set that is used to derive instructions to remove malware from the computing device and a specific characteristic data set having data specific to the computing device.

19. A method as recited in claim 11 further comprising:

using a value from said local malware behavior data set in said normalized data set when a particular malware behavior is mutable by the malware and using a value from said global malware behavior data set in said normalized data set when the particular malware behavior is not mutable by the malware.

20. A method of deleting malware from a computing device, the method comprising:
- receiving by the computing device a detailed malware behavior data set from a remote source, the detailed malware behavior data set indicating how the malware operated on at least one other computing device;
- retrieving a local malware behavior data set that indicates how the malware operated on the computing device;
- running a graph similarity algorithm, wherein a first input to the algorithm is a first graph representing the detailed malware behavior data set and a second input to the algorithm is a second graph representing the local malware behavior data set, wherein said first graph includes at least first and second nodes and a link, wherein said first node is a process, said second node is a file, and said link is a step taken by malware that describes a relationship between said process and said file;
- outputting a third graph representing a degree of similarity between the first graph and the second graph, wherein the third graph is used to create a normalized malware behavior data set;
- creating a malware repair module using the normalized malware behavior data set, the repair module having a scan section and a clean section; and
- executing the malware repair module on a repair module execution engine and deleting the malware from the computing device.

21. A method as recited in claim 20 wherein creating the normalized malware behavior data set further comprises:
- comparing the detailed malware behavior data set with the local malware behavior data set to determine similarities.

22. A method as recited in claim 20 further comprising:
- using a value from said local malware behavior data set in said normalized malware behavior data set when a particular malware behavior is mutable by the malware and using a value from said detailed malware behavior data set in said normalized malware behavior data set when the particular malware behavior is not mutable by the malware.

23. A method as recited in claim 20 further comprising:
- querying the remote source with the local malware behavior data set created by a malware detection engine executing on the computing device.

24. A method as recited in claim 20 wherein creating the malware repair module further comprises:
- utilizing a codified malware repair rule containing instructions on deleting the malware from the computing device.

25. The method as recited in claim 20 wherein the normalized malware behavior data set includes a meta-characteristic data set that is used to derive instructions to remove malware from the computing device and a specific characteristic data set having data specific to the computing device.

26. A method as recited in claim 20 further comprising:
- when a node in the first graph corresponds to a node in the second graph and their values are mutable by malware, using a value from said node in the second graph in the normalized malware behavior data set.

* * * * *

UNITED STATES PATENT AND TRADEMARK OFFICE
CERTIFICATE OF CORRECTION

PATENT NO. : 8,739,283 B1
APPLICATION NO. : 12/632158
DATED : May 27, 2014
INVENTOR(S) : Zhang et al.

It is certified that error appears in the above-identified patent and that said Letters Patent is hereby corrected as shown below:

In the Specification:
Column 11, Line 21, change "TROLLINEAGE" to -- TROJ_LINEAGE --.

In the Claims:
Claim 8, Column 13, Line 52, delete the word "and".

Signed and Sealed this
Thirtieth Day of June, 2015

Michelle K. Lee
*Director of the United States Patent and Trademark Office*